Dec. 12, 1961  M. R. STELNICKI  3,012,895
FOOD PACKAGE
Filed Nov. 7, 1958
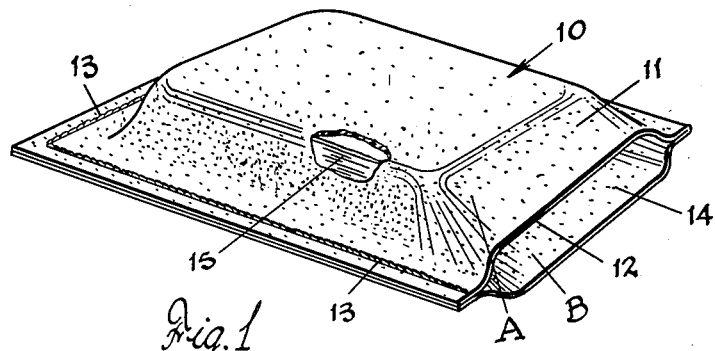
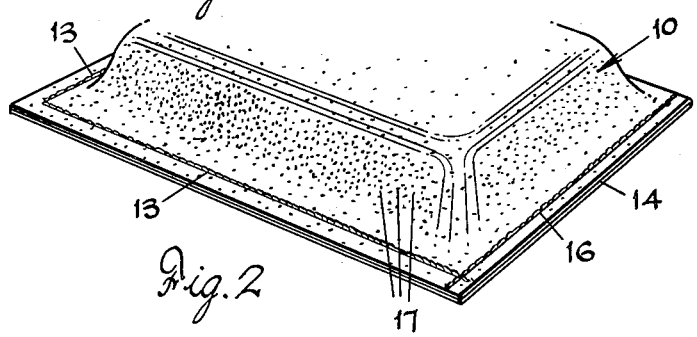
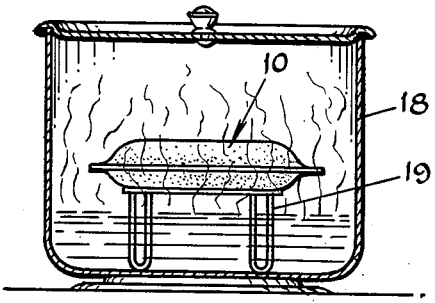
INVENTOR.
Mitchel R. Stelnicki
BY
ATTORNEY

United States Patent Office 3,012,895
Patented Dec. 12, 1961

3,012,895
FOOD PACKAGE
Mitchel R. Stelnicki, 4828 Hanaford Drive, Toledo, Ohio
Filed Nov. 7, 1958, Ser. No. 772,581
5 Claims. (Cl. 99—192)

The present invention relates generally to the processing of food, and more particularly to a method of reheating or cooking food as well as a novel food package adapted to be heated.

Although adapted for other uses, the present invention is particularly useful in the steam heating or processing of foods and more specifically in the heating of refrigerated and frozen foods. Generally speaking, packaged frozen foods, when it is desired to use them, are removed from a refrigerator or cold storage cabinet and allowed to thaw for several hours prior to heating the food. In some instances the frozen food package may be placed directly in a container of hot water or the package may be steamed. It is customary however to seal the frozen foods in an air tight package so that if the foods are steamed the steam only heats the outer surface of the package and thus the heat absorbed by the package must be conducted through the package walls to the foods. With some foods the outer wrapping or package may be removed and the frozen food placed directly in a container of hot water or subjected to steam by placing the food in a kettle having a small amount of water in the bottom thereof which is heated to produce the steam. With certain foods it is not practical to do this, for example, in the case of frozen puddings or custards the water or steam would cause the food to become soggy. This is also the case with sandwiches of the bun type such as hot dogs or hamburgers.

In accordance with the present invention, however, there is provided a method of steam processing foods which prevents water or steam condensation from contacting the food and thus overcomes the aforementioned difficulties. There is also provided in accordance with the present invention a novel package for containing a food to be steam processed.

It is therefore an important object of the present invention to provide an improved method of heat processing foods.

Another object of the invention is to provide an improved food package adapted to be steamed to process the food contained therein.

A further object of the invention is to provide a method of steam processing food as well as a novel food package wherein the food may be subjected to steam and rapidly heated while at the same time condensation caused by the steam is prevented from contacting the food.

The above mentioned and other features and objects of this invention and the manner of attaining them will become more apparent and the invention itself will be best understood by reference to the following description of an embodiment of the invention taken in conjunction with the accompanying drawings, wherein:

FIG. 1 is a schematic view of a novel food package constructed in accordance with the present invention and prior to complete sealing thereof;

FIG. 2 is a schematic view of the food package of FIG. 1 after being sealed; and FIG. 3 is a sectional view of a steam kettle in which the food package may be steam heated.

Briefly stated, the method of the present invention comprises encasing a food to be heated within the novel food package of the invention which comprises an envelope provided with a plurality of openings of a size insufficient to pass condensation on the surface of the envelope, and then steaming the food and envelope within a steam chamber such as, for example, a kettle provided with a top and containing a small amount of water in its bottom. Preferably, the food package is supported on a framework out of contact with the water.

With reference now to the drawings and particularly to FIG. 1, there is shown a novel food package 10 manufactured in accordance with the present invention. The package comprises an envelope or pouch 11 formed of a single piece of material 12, preferably flexible plastic, folded upon itself and secured along its edges by means of stitching 13 so as to close the envelope on two of its three sides thus leaving an open end 14 through which the food 15 may be inserted. After the food is inserted, the open end of the bag or envelope may be suitably sealed by additional stitching 16 closing the open end 14, thus providing an envelope having the interior thereof which contains the food to be processed substantially sealed from the atmosphere outwardly of the envelope. Although the package is shown as being stitched, it will be readily understood that depending upon the material used it may also be heat sealed or chemically sealed with a suitable solvent.

The major surfaces A and B of the envelope 11 are provided with a multiplicity of fine openings 17 of a size insufficient to pass condensation or water droplets on the surface of the envelope but of a size sufficient to pass steam. Preferably, the openings range from between about 0.003 to 0.025 of an inch, and cover at least about 25% of the entire surface area of the envelope. Preferably, over 75% of the surfaces A and B are covered with openings and the openings are preferably spaced from one another at distances ranging from between about $\frac{1}{32}$ inch to about $\frac{1}{2}$ inch. Optimum spacing is between about $\frac{1}{32}$ to $\frac{1}{4}$ inch.

As will be later described, the method of the invention is adapted to be carried out within a simple pot or kettle such as is readily available to the average housewife. Since such kettles when placed over the usual gas burner or heating coil of an electric stove will only produce steam at a temperature slightly in excess that of boiling water, a great deal of condensation develops on the under surface of the kettle lid and thus drops downwardly onto the food package contained therein. However, with the package of the present invention the multiplicity of fine openings which will readily admit steam are of such a size that condensation or water droplets on the surface of the food package will not penetrate through to the interior of the package and thus render the food therein wet and soggy. Since the openings are in both surfaces of the envelope the interior thereof as well as the food is substantially uniformly heated by the steam.

The openings may be formed in a number of ways and may be formed by inserting needles or the like through the plastic sheet 12. It is preferred, however, that the plastic be folded in such a manner that the surface of the plastic which is penetrated by the needles is disposed inwardly. Thus any residue of material which is forced outwardly by the passage of the needle will be on the outside of the package and thus tend to act as a dam against water droplets. Also, the typical opening formed by the passage of a needle is generally funnel-like in cross-section and thus it is preferred that the restricted diameter be disposed on the outermost surface of the package.

The characteristics of the envelope or bag for containing the food are important depending upon how the food is to be handled. More specifically, if in the treatment of the food it is desired to place the food within the envelope prior to refrigerating or freezing the food, it is desirable that the envelope be flexible at freezing temperatures for the food, for example 0 to 32° F. If this flexibility is not provided for and the envelope is rigid at the freezing temperatures for the food, the envelope will readily fracture when handled thus providing openings therein which would pass condensation. Since the envelope must be subjected to steam it is also important that it not soften at minimum steam temperatures, for example, temperatures in the order of 212° F. At the same time, however, since the method of the invention may be carried out in pressurized steam vessels where the steam temperatures run higher, the envelope preferably should withstand temperatures of about 240° F. without softening. It is also preferred that the envelope material have a relatively low specific heat so that the food package may be readily removed from a steam chamber without burning the hands. For visual appeal for frozen food package as well as for readily identifying the contents thereof, it is also desirable that the envelope be transparent so that the food therein will be readily visible.

Envelope material which will generally satisfy the foregoing specifications may be formed of the well known polyester films. One film which has proved satisfactory for the envelope is "Mylar." This is a polyester film made from polyethylene terephthalate with the polymer being formed by the condensation reaction between ethylene glycol and terephthalic acid. The thickness of the film may satisfactorily range between about 0.00025" to 0.0075". Film thicknesses in this range are economic and also provide sufficient strength to enable the package to resist damage due to handling.

In accordance with the method of the invention the food to be processed may be either at room temperature or it may be frozen. If it is frozen it may be placed within the envelope and sealed therein either prior to freezing or after being frozen. In either case, however, the envelope is effectively sealed to the extent that for all practical purposes the only communication with the interior thereof is through the multiplicity of fine openings. The packaged food may then be placed in a kettle 18 such as is shown in FIG. 3 of the drawings and which is provided with a suitable rack 19 for supporting the package out of contact with the kettle bottom. A small amount of water is then placed within the kettle and brought to boiling temperature. The package may be placed within the kettle either prior to the water being heated or after the kettle has become filled with steam. Due to the multiplicity of fine openings in the food package the steam within the kettle readily penetrates to the interior of the package thus effectively heating the food contained therein while at the same time any condensation or water droplets deposited or formed on the surface of the package will not penetrate to the interior of the package.

Foods packaged in accordance with the invention and processed in accordance with the method of the invention may be rapidly heated to suitable temperatures. For example, a frozen frankfurter and bun when packaged and steamed in the manner previously set forth is at a suitable temperature within three minutes after being exposed to the steam. At the same time, however, the bun of the frankfurter is not soggy as would be the case when steamed in accordance with conventional methods and thus is more satisfactory. Custards, puddings, or the like may be treated similarly to sandwiches. In this case, the container for the custard, pudding or the like is merely placed within the plastic bag which is subsequently sealed. Thus after being steamed no water vapor or condensation will be present within the envelope to dilute the custard or make puddings soggy.

While there is described above the principles of this invention in connection with specific apparatus, it is to be clearly understood that this description is made only by way of example and not as a limitation to the scope of this invention.

I claim:

1. A food package for use with a steam chamber comprising an article of food, and an envelope for surrounding and containing said food, said envelope being provided with a multiplicity of openings for readily admitting steam to the interior of the envelope and of a size sufficient to pass steam but insufficient to pass condensation on the surface of the envelope.

2. A food package as defined in claim 1, wherein the envelope is flexible and the openings are provided in opposed surface portions.

3. A food package as defined in claim 2, wherein the openings in the envelope have a diameter of between about 0.003 inch to about 0.025 inch.

4. A food package as defined in claim 1, wherein the openings are distributed over at least 25% of the surface area of the envelope.

5. A frozen food package for use with a steam chamber, comprising a frozen article of food, and an envelope for containing and surrounding said food, said envelope being flexible at freezing temperatures for the food and being provided with a multiplicity of openings over at least 25% of the surface area thereof, said openings having a diameter of between about 0.003 and 0.025 inch for readily admitting steam to the interior of the envelope.

References Cited in the file of this patent

UNITED STATES PATENTS

| | | |
|---|---|---|
| 2,452,174 | Arnold | Oct. 26, 1948 |
| 2,633,284 | Moffett et al. | Mar. 31, 1953 |
| 2,850,391 | Gunsberg | Sept. 2, 1958 |
| 2,850,392 | Gunsberg | Sept. 2, 1958 |
| 2,870,954 | Kulesza | Jan. 27, 1959 |

OTHER REFERENCES

Modern Packaging, November 1956, pages 99–103.
Food Engineering, May 1957, page 22.